United States Patent
Russ

(10) Patent No.: US 7,462,837 B2
(45) Date of Patent: Dec. 9, 2008

(54) NUCLIDE IDENTIFIER SYSTEM

(75) Inventor: William R. Russ, East Hampton, CT (US)

(73) Assignee: Canberra Industries, Inc., Meriden, CT (US)

( * ) Notice: Subject to any disclaimer, the term of this patent is extended or adjusted under 35 U.S.C. 154(b) by 107 days.

(21) Appl. No.: 11/661,221

(22) PCT Filed: Aug. 26, 2005

(86) PCT No.: PCT/US2005/030622

§ 371 (c)(1),
(2), (4) Date: Feb. 26, 2007

(87) PCT Pub. No.: WO2006/036425

PCT Pub. Date: Apr. 6, 2006

(65) Prior Publication Data

US 2008/0011962 A1    Jan. 17, 2008

Related U.S. Application Data

(60) Provisional application No. 60/604,512, filed on Aug. 26, 2004.

(51) Int. Cl.
*G01J 1/42* (2006.01)
*G01T 1/00* (2006.01)

(52) U.S. Cl. .................... 250/395; 250/252.1; 250/362; 250/369

(58) Field of Classification Search ............. 250/252.1, 250/362, 369, 395
See application file for complete search history.

(56) References Cited

U.S. PATENT DOCUMENTS

| 3,638,000 | A | 1/1972 | Franco et al. |
| 4,602,348 | A | 7/1986 | Hart |
| 4,742,226 | A | 5/1988 | De Filippis |
| 5,412,216 | A | 5/1995 | Dodson, Jr. |
| 5,744,804 | A | 4/1998 | Meijer et al. |
| 6,057,542 | A | 5/2000 | Meijer et al. |
| 6,448,564 | B1 * | 9/2002 | Johnson et al. ............. 250/394 |
| 6,492,642 | B1 | 12/2002 | Belanov et al. |
| 2002/0079460 | A1 | 6/2002 | Uezu et al. |
| 2004/0064289 | A1 | 4/2004 | Uezu et al. |

OTHER PUBLICATIONS

Canberra Industries, Inc., Optional Genie-VMS Peak Search Programs, Gamma-M Analysis, 2001, p. 2.*
Russ, William R., Nuclear Instruments and Methods in Physics Research A 259 (2007) 288-291.*

* cited by examiner

*Primary Examiner*—David P. Porta
*Assistant Examiner*—Casey Bryant
(74) *Attorney, Agent, or Firm*—David W. Carstens; Carstens & Cahoon, LLP

(57) ABSTRACT

In a preferred embodiment, a method of identifying nuclides, including the steps of: determining spectral continuum via a peak erosion process to render a residual peak spectrum; filtering a standard nuclide library specified by a user to select candidate nuclides; simultaneously fitting calibrations and activities of selected candidate nuclides from the standard library to the peak spectrum using a standard least squares method; calculating statistical significances of optimized nuclide activities and determining shape correlations between optimized candidate nuclide peak spectra and measured peak spectrum with alternative candidates subtracted; and identifying and providing activities of nuclides determined to have sufficiently significant activities and sufficient shape correlations.

6 Claims, 2 Drawing Sheets

US 7,462,837 B2

NUCLIDE IDENTIFIER SYSTEM

CROSS-REFERENCE TO RELATED APPLICATIONS

The present application is a 35 USC 371 of PCT Application No. PCT/US2005/030622, filed Aug. 26, 2005, and benefit is claimed of U.S. Provisional Application No. 60/604,512, filed Aug. 26, 2004, both titled NUCLIDE IDENTIFIER SYSTEM.

TECHNICAL FIELD

The present invention relates to nuclides generally and, more particularly, to a novel method of identifying nuclides.

BACKGROUND ART

Radionuclides emit photon radiation (x-rays and gamma-rays) at distinct, characteristic energies. These monoenergetic emissions travel from the radionuclide source and interact with surrounding materials in ways that can result in partial or full energy deposition in the material. Instrumentation for the measurement of photon radiation includes a sensor or detector. Photons can deposit either full energy or partial energy (some lost on the way to the detector or some escapes after interacting) in the detector. Radiation detectors convert the radiation energies to equivalent electrical signals. These electrical signals are then processed, filtered, amplified and digitized. Typical spectroscopy systems store each incoming signal pulse as a count in a histogram, where each count is stored in an energy bin or channel that correlates to the amplitude of the corresponding pulse. The resulting spectrum is a pulse height frequency distribution, with a shape related to the energy distribution of the measured radiation. Full energy depositions will tend to be indicated in the spectrum by clumps, or peaks. Partial energy depositions will tend to be more spread out, forming the non-peaked continuum. Since different radionuclides emit radiation with distinct energy distributions, analyzing the spectrum can provide information about what radionuclides make up the source of radiation.

Spectral analysis requires that the specific measurement system characteristics are known and recorded in the form of calibrations so that the spectrum can be properly interpreted. These calibrations include an energy calibration, shape calibration, and efficiency calibration. The energy calibration indicates what range of energies (or pulse heights) is collected in each spectrum channel. The shape calibration indicates the energy resolution of the system at any given energy. Monoenergetic radiation causes a collection of counts at the corresponding energy (at the channel specified by the energy calibration) with a characteristic spread, or shape, with counts spilling into adjacent channels. The energy resolution is a measure of how wide (in channels or energy) a monoenergetic photon source would appear in the spectrum in the form of a more or less Gaussian (Normal) distribution, known as a peak. The efficiency calibration indicates the relation between the number of counts seen in the spectrum at a given energy and the corresponding number of radiation emissions produced at the source at that energy. Typically, this efficiency calibration relates only the counts from photons that have not interacted on the way to the detector from the source, and have not lost any energy other than in the detector (only full energy depositions). This type of efficiency calibration is known as a peak efficiency calibration. Efficiency calibrations are not just a function of the detection system (as is primarily the case with the energy and shape calibrations), but will also vary depending on the source-detector geometry or anything that affects the probability of full energy deposition inside the detector.

Nuclide identification (NID) algorithms determine the identity and quantity of radionuclides based on the output of radiation measurement instrumentation. This output includes the spectrum (histogram indicating the frequency of counts in sequential energy bins or channels) and calibrations that define the spectral channel energy ranges (energy calibration), expected monoenergetic response function (shape calibration) and the count rate to emission rate conversion (efficiency calibration). NID algorithms correlate the spectral information as interpreted by the supplied calibrations with nuclides provided by a reference nuclide library. For each nuclide described in the library, the information provided usually includes expected monoenergetic emission energies with corresponding relative emission rates. The way the NID algorithm correlates all of this information is usually controlled by user-specified parameters. In general, there have been two paradigms used to implement NID algorithms: peak correlation and deconvolution.

Peak correlation uses the energy and shape calibration to locate peaks (find energies) in the spectrum and to determine their areas (corresponding count rates). Identification is done by directly correlating library energies to peak energies found in the spectrum. Sometimes least-squares fitting is used to determine how much peak area ought to be attributed to nuclides with similar energies (interference correction). The geometry dependent efficiency calibration is used to convert peak count rates to expected source emission rates and therefore quantify nuclide activities. Peak correlation is the dominant paradigm in the industry.

Deconvolution (sometimes referred to as spectrum stripping or unfolding) uses a full energy response function to fit expected nuclide energy distributions to the measured spectrum. This requires that either the shape calibration function be expanded beyond only a monoenergetic response or the nuclide library be expanded to include the full energy response for each nuclide (template matching). The full energy response of the measurement system depends on a number of variables, including the nuclide emission energies, operating conditions, source-detector geometry and the counting rate. An advantage of deconvolution is that it uses all of the available information provided by the spectrum (rather than just the peak data). A disadvantage is that it relies on the accuracy of the full energy response function to correctly identify and quantify nuclides and the results may be more sensitive to measurement variables than peak correlation. Deconvolution can also sometimes require extensive measurement system full energy characterization, a more difficult and laborious process than typical peak shape calibration, with a more limited scope of applicability.

DISCLOSURE OF INVENTION

The present invention provides a method of identifying nuclides, comprising the steps of: determining spectral continuum via a peak erosion process to render a residual peak spectrum; filtering a standard nuclide library specified by a user to select candidate nuclides; simultaneously fitting calibrations and activities of selected candidate nuclides from said standard library to said peak spectrum using a standard least squares method; calculating statistical significances of optimized nuclide activities and determining shape correlations between optimized candidate nuclide peak spectra and measured peak spectrum with alternative candidates subtracted; and identifying and providing activities of nuclides determined to have sufficiently significant activities and sufficient shape correlations.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, on which.

BEST MODE FOR CARRYING OUT THE INVENTION

Figure 1:
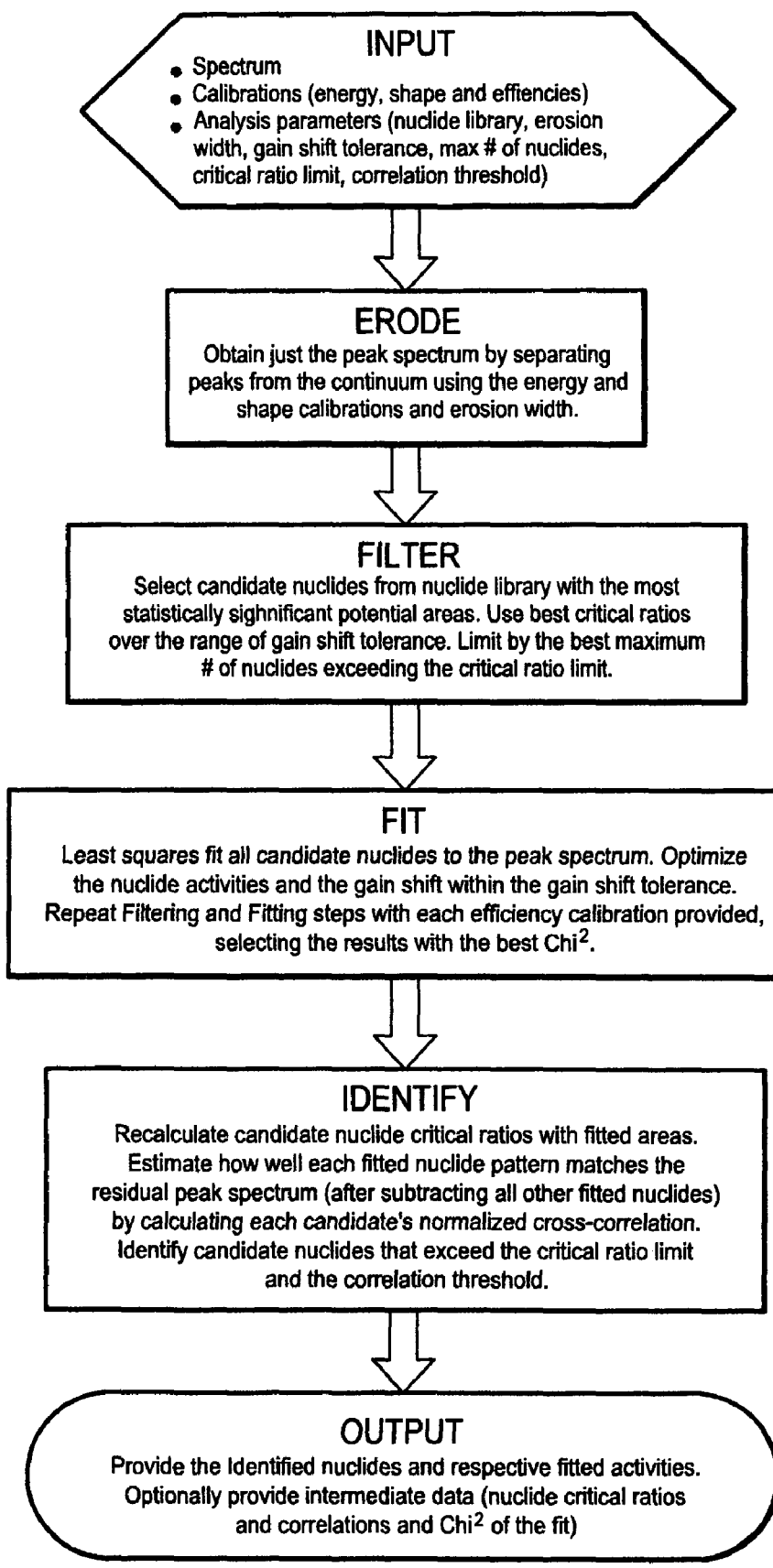
FIG. 1 is a flow sheet showing the algorithm of the present invention.

The NID algorithm of the present invention does not strictly conform to either the peak correlation or deconvolution paradigms. In general, the algorithm most closely approximates deconvolution without requiring a full energy response function. Using just the energy and shape calibrations, spectral counts are attributed to either the continuum or peaks. Then the isolated peak patterns are matched to those specified in a nuclide library using just the peak efficiency calibration. This novel nuclide identification algorithm consists of a succession of steps that result in the identification and quantification of measured source radionuclides: Erosion, Filtering, Fitting, and Identifying.

Erosion

Analysis first determines the spectral continuum via a peak erosion process. Peak erosion separates the peaks from the non-peak spectral constituents (continuum) to be able to designate a peak spectrum (array containing only peak constituents). The peak erosion process requires only the standard energy and shape calibrations and does not involve locating or analyzing peaks (it is like a band-pass filter that isolates peaks). A peak erosion algorithm is already used as an integral preparation step in an existing publicly available Canberra Industries, Inc. peak analysis algorithm, Gamma-M, with a somewhat different implementation. This preparatory peak erosion process is the only similarity between Gamma-M and the present invention.

Filtering

The residual peak spectrum is then used to select candidate nuclides from a standard nuclide library specified by the user. This nuclide filtering process is done by checking to see which nuclides might possibly be represented in the peak spectrum by determining which ones might have statistically significant area or counts. The maximum possible source activity is determined by checking the amplitude of the peak spectrum around all of the nuclide library peak energies. If the maximum possible source activity for a given library nuclide is considered statistically significant compared to a threshold specified by the user, the nuclide becomes a candidate.

Fitting

The selected candidate nuclides from the specified library are then simultaneously fit to the peak spectrum using a standard least squares (Chi-squared minimization) method. The parameters that are fit include the nuclide amplitudes/activities and the energy calibration slope term. The energy calibration slope term, corresponding to the gain shift, is limited to within a specified gain shift tolerance (this allows for some energy calibration drift).

Identifying

For each of the fitted candidate nuclides, the statistical significance of the fitted activity is recalculated with the gain shift fixed at the fit value and the maximum nuclide channel amplitude set by the fit. Those candidate nuclides with activities that exceed the set threshold are then also subjected to a shape correlation test. Shape correlation is a pattern matching process that measures the degree of similarity between the theoretical nuclide peak shape as defined in the nuclide library and calibrations and the actual shape attributed to the nuclide during the fit. The correlation is calculated on a normalized scale between −1 and 1 (−1 is a mirror image, 0 means completely unrelated, and 1 is a perfect pattern match). Nuclides determined to have sufficiently significant activities and seem to be sufficiently shaped in accordance with the expected shape are considered identified and their fitted activities are output.

FIG. 1 shows an illustration of the algorithm of the present invention.

In summary, the algorithm of the present invention uses a standard spectrum with corresponding standard energy, shape and efficiency calibrations and a standard nuclide library to attribute spectral area to nuclides. If that area is deemed statistically significant and the distribution of that area is deemed sufficiently similar to the expected shape in accordance with user-specified parameters, the nuclide is identified. Strictly speaking, no peaks are individually analyzed outside the context of the nuclide, so the algorithm deviates from the peak correlation paradigm. Also, the analysis is primarily limited to the peak response functions, so unlike the standard deconvolution paradigm, problems with the variability and restrictions inherent in relying on accurate full energy response functions are avoided.

EXAMPLE

Erosion

Figure 2A:
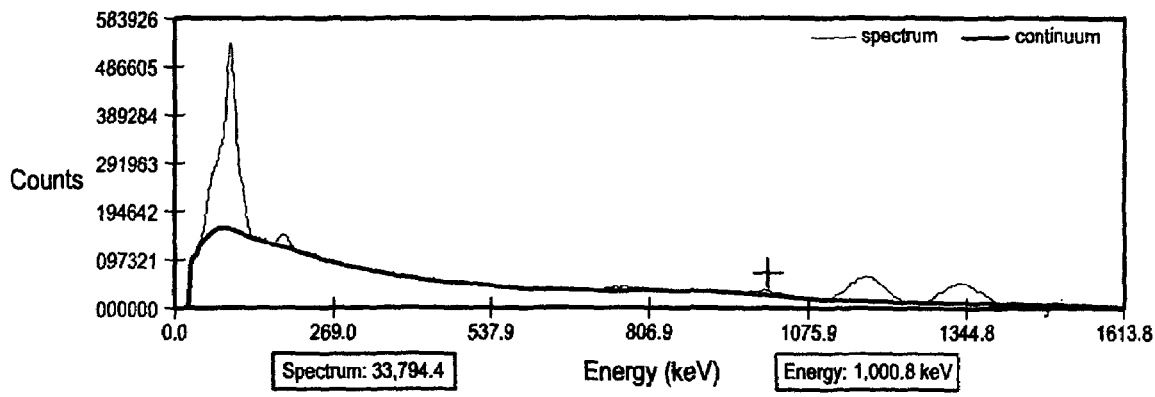
FIG. 2(a)-2(c) are graphs of counts versus energy for a $^{60}$Co and low enrichment uranium ($^{235}$U and $^{238}$U+daughters) spectrum from a 3×3 NaI detector with continuum specified by peak erosion and best fit from minimizing the Chi$^2$ of the candidate theoretical spectra.

Peak erosion is an iterative process of spectral smoothing where the process is a function of the peak shape calibration. The purpose is to reliably separate spectral peak features from non-peak area (continuum). The user controls this process by specifying the Erosion Width parameter. FIG. 2(a) shows a $^{60}$Co plus low enrichment uranium (235U and 238U+daughters) spectrum taken with a 3×3 NaI detector, with the continuum specified by peak erosion with the Erosion Width set to a value of 0.7, the recommended default value.

Filter

With the peak spectrum (spectrum minus continuum) specified, a nuclide library filtering step narrows down the field of prospective nuclides that need to be fit. Based on the nuclide peak energies and abundances from the library and respective efficiencies from the efficiency calibration, the relative peak heights and locations are specified. The possible amplitude of each nuclide is calculated and determined as a ratio to what is considered a statistically significant amplitude (the critical level, Lc). This critical ratio is determined over a range of gain shifts specified by a % Gain Shift Tolerance to allow for inaccuracies in the energy calibration slope. In this example, there were 26 nuclides in the library (default used for homeland security applications and ANSI testing). The default % Gain Shift Tolerance, used in this example, was set to 5%. The calculated filter critical ratios ranged from 0.11 to 29.00. The user specifies a Critical Ratio Limit that is used to designate candidate nuclides to take to the next analysis step. In this case, the Critical Ratio Limit was set to the default value of 5. In the example, nuclides with critical ratios that exceeded 5 were: $^{57}$Co (5.20), $^{60}$Co (29.00), $^{133}$Xe (12.95), $^{201}$Tl (9.48), $^{204}$Tl (9.48), $^{235}$U (7.63), $^{238}$U+daughters (25.19), and $^{241}$Am (7.85). Of these 8 nuclides, $^{57}$Co was not designated as a candidate nuclide because only the top 7 candidates were selected. This is because an additional filtering criterion is a Max # of Nuclides parameter, set to the default value of 7. This parameter is used to limit the analysis to enhance speed, with the default value usually good for spectra with only about 1-3 nuclides and a library of 20-30 nuclides.

Fit

Figure 2B:
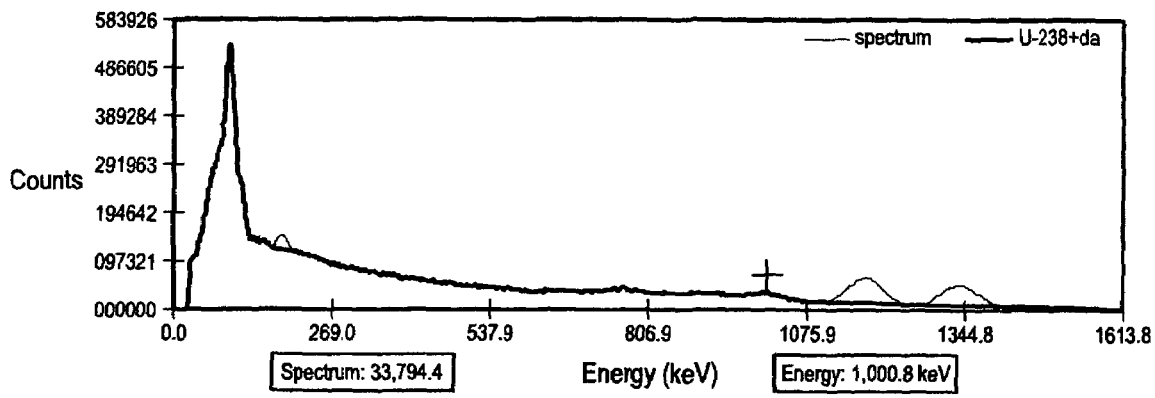
Figure 2C:
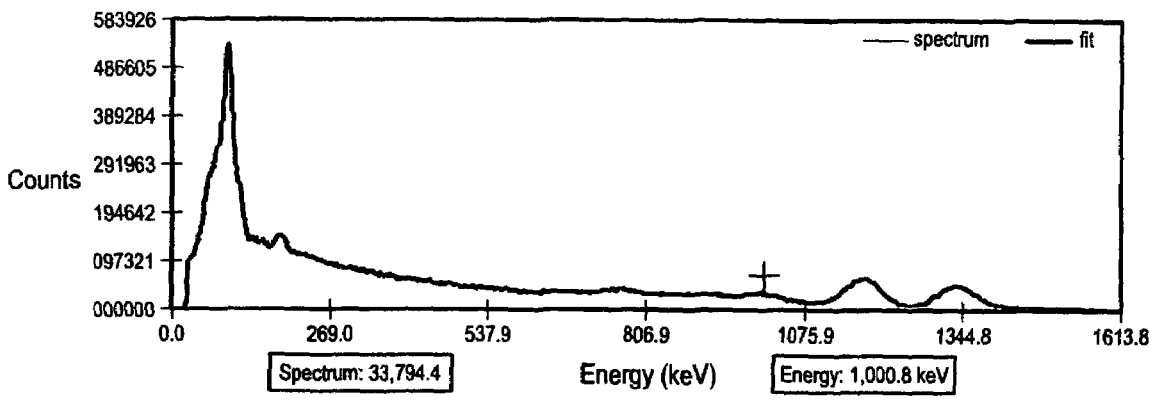

The activities/amplitudes of the seven candidate nuclides were then iteratively adjusted, along with the gain shift (energy calibration slope) in order to optimize their values. Optimization is achieved by minimizing the Chi$^2$ (least squares) value or difference between the peak spectrum and the sum of the candidate nuclide theoretical spectra. The nuclide theoretical spectra are constructed using the library information as interpreted by the provided energy, shape, and efficiency calibrations. FIGS. 2(b) and 2(c) show the result of fitting the candidates. This fit resulted in the gain shift being set to 0.46% and the total count rates of the candidates being set to: $^{60}$Co (286.64), $^{133}$Xe (0), $^{201}$Tl(0), $^{204}$Tl (0), $^{235}$U (113.61), $^{238}$U+daughters (819.35), and $^{241}$Am (35.47).

Identify

The critical ratio is again determined for each of the candidates, with the gain shift and amplitude set at the optimized values. The results in the example are: $^{60}$Co (23.37), $^{133}$Xe (0), $^{201}$Tl (0), $^{204}$Tl (0), $^{235}$U (8.87), $^{238}$U+daughters (43.82), and $^{241}$Am (5.68). The Critical Ratio Limit of 5 is used again, leaving the remaining candidates at just $^{60}$Co, $^{235}$U, $^{238}$U+daughters, and $^{241}$Am. The final, and perhaps most discerning, wicket to pass to be considered identified is the correlation test. The correlation test is performed by comparing each remaining nuclide shape to the peak spectrum with the contributions from the other fitted nuclides subtracted out. This residual peak spectrum, attributed to the candidate of interest, undergoes a normalized cross-correlation with the theoretical nuclide peak spectrum. This statistical pattern matching process produces a correlation value for each candidate that can range between −1 (mirror image, with no significance in spectroscopy) to 1 (exact same pattern), with a value of 0 implying no statistical similarity. The results of the example are: $^{60}$Co (0.98), $^{235}$U (0.85), $^{238}$U+daughters (0.92), and $^{241}$Am (0.23). The specified Correlation Threshold in the example is the default value of 0.80, resulting in the proper identifications of $^{60}$Co, $^{235}$U, and $^{238}$U+daughters. All have significant areas with fitted shapes that sufficiently match expected, theoretical peak patterns.

It will thus be seen that the preceding description, is efficiently attained and, since certain changes may be made in the above construction and/or method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention that, as a matter of language, might be said to fall therebetween.

The invention claimed is:

1. A method of identifying nuclides, comprising the steps of:
    (a) determining spectral continuum via a peak erosion process to render a residual peak spectrum;
    (b) filtering a standard nuclide library specified by a user to select candidate nuclides;
    (c) simultaneously fitting calibrations and activities of selected candidate nuclides from said standard library to said peak spectrum using a standard least squares method;
    (d) calculating statistical significances of optimized nuclide activities and determining shape correlations between optimized candidate nuclide peak spectra and measured peak spectrum with alternative candidates subtracted; and
    (e) identifying and providing activities of nuclides determined to have sufficiently significant activities and sufficient shape correlations.

2. A method of identifying nuclides, as defined in claim 1, further comprising:
    step (b) includes selecting a candidate nuclide if activity of said nuclide is statistically significant compared to a threshold specified by a user.

3. A method of identifying nuclides, as defined in claim 1, further comprising:
    step (c) includes fitting parameters of nuclide amplitude/activities and energy calibration slope term.

4. A method of identifying nuclides, as defined in claim 3, further comprising:
    providing said calibration slope term, corresponding to gain shift, limited to within a specified gain shift tolerance to allow for some energy calibration drift.

5. A method of identifying nuclides, as defined in claim 1, further comprising:
    step (b) includes determining a maximum possible activity/amplitude over range of gain shift allowed by a specified % Gain Shift Tolerance.

6. A method of identifying nuclides, as defined in claim 1, further comprising:
    step (b) includes a user specifying an amplitude threshold that is used to designate candidate nuclides.

* * * * *